United States Patent
Yamamoto

(10) Patent No.: US 11,578,164 B2
(45) Date of Patent: Feb. 14, 2023

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Chiyoda-ku Tokyo (JP)

(72) Inventor: Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 435 days.

(21) Appl. No.: 16/758,855

(22) PCT Filed: Nov. 19, 2018

(86) PCT No.: PCT/JP2018/042726
§ 371 (c)(1),
(2) Date: Apr. 24, 2020

(87) PCT Pub. No.: WO2019/107209
PCT Pub. Date: Jun. 6, 2019

(65) Prior Publication Data
US 2020/0347172 A1    Nov. 5, 2020

(30) Foreign Application Priority Data

Nov. 30, 2017   (JP) .............................. JP2017-230495

(51) Int. Cl.
| | |
|---|---|
| *H01M 4/02* | (2006.01) |
| *C08F 297/04* | (2006.01) |
| *C08K 3/04* | (2006.01) |
| *C08L 9/06* | (2006.01) |
| *H01M 4/62* | (2006.01) |
| *H01M 10/0525* | (2010.01) |
| *H01M 10/0566* | (2010.01) |

(52) U.S. Cl.
CPC ............ *C08F 297/046* (2013.01); *C08K 3/04* (2013.01); *C08L 9/06* (2013.01); *H01M 4/622* (2013.01); *C08K 2201/001* (2013.01); *C08L 2203/20* (2013.01); *H01M 10/0525* (2013.01); *H01M 10/0566* (2013.01)

(58) Field of Classification Search
CPC ........................................................ H01M 4/02
See application file for complete search history.

(56) References Cited

U.S. PATENT DOCUMENTS

| | | | |
|---|---|---|---|
| 5,082,732 A | 1/1992 | Ueda et al. | |
| 6,248,834 B1 * | 6/2001 | Mori ..................... | C08L 53/025 524/527 |
| 11,098,148 B2 | 8/2021 | Kodemura et al. | |
| 2009/0286155 A1 * | 11/2009 | Takehara .......... | H01M 10/0569 429/199 |
| 2016/0204439 A1 | 7/2016 | Sonobe | |
| 2019/0044147 A1 | 2/2019 | Yamamoto | |

FOREIGN PATENT DOCUMENTS

| | | |
|---|---|---|
| CN | 1939959 A | 4/2007 |
| JP | 2007091780 A | 4/2007 |
| JP | 2012099251 A | 5/2012 |
| JP | 2017157481 A | 9/2017 |
| WO | 2017056404 A1 | 4/2017 |
| WO | 2017130889 A1 | 8/2017 |

OTHER PUBLICATIONS

Jun. 2, 2020, International Preliminary Report on Patentability issued in the International Patent Application No. PCT/JP2018/042726.
Jun. 11, 2021, the Extended European Search Report issued by the European Patent Office in the corresponding European Patent Application No. 18882658.0.
Jan. 22, 2019, International Search Report issued in the International Patent Application No. PCT/JP2018/042726.

* cited by examiner

*Primary Examiner* — Jacob B Marks
(74) *Attorney, Agent, or Firm* — Kenja IP Law PC

(57) ABSTRACT

Provided is a binder composition for a non-aqueous secondary battery electrode with which it is possible to form an electrode having excellent electrolyte solution injectability and process adhesiveness. The binder composition for a non-aqueous secondary battery electrode contains a particulate polymer formed by a polymer that includes a block region composed of an aromatic vinyl monomer unit and has a tetrahydrofuran-insoluble content of not less than 5 mass % and not more than 40 mass %. The binder composition for a non-aqueous secondary battery electrode preferably further contains a water-soluble polymer that includes a hydrophilic group and has a weight-average molecular weight of not less than 15,000 and not more than 500,000.

8 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. Consequently, in recent years, studies have been made to improve electrodes and other battery components with the aim of achieving even higher non-aqueous secondary battery performance.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation.

In one specific example, Patent Literature (PTL) 1 discloses that it is possible to provide an electrode for a non-aqueous secondary battery having excellent peel strength and a non-aqueous secondary battery having excellent cycle characteristics by using a binder composition for a non-aqueous secondary battery electrode that contains, in specific proportions: a particulate block copolymer that includes a block region composed of an aliphatic conjugated diene monomer unit and a block region composed of an aromatic vinyl monomer unit and that has a volume-average particle diameter of 0.6 μm to 2.5 μm; and a particulate random copolymer that includes an aliphatic conjugated diene monomer unit and an aromatic vinyl monomer unit and that has a volume-average particle diameter of 0.01 μm to 0.5 μm.

CITATION LIST

Patent Literature

PTL 1: WO 2017/056404 A1

SUMMARY

Technical Problem

It is desirable for an electrode of a secondary battery to have excellent electrolyte solution injectability from a viewpoint of enhancing battery characteristics such as output characteristics.

Also, in the production process of a secondary battery, an electrode and a separator that have not yet been immersed in electrolyte solution may be pressure bonded to obtain a laminate, may be cut to a desired size as necessary, and may be transported as a laminate. During such cutting or transportation, the pressure bonded electrode and separator may become misaligned, leading to problems such as the occurrence of faults and reduction of productivity. For this reason, an electrode of a secondary battery needs to display high adhesiveness to a separator even in a state prior to immersion in electrolyte solution (i.e., high process adhesiveness).

However, it has not been possible to form an electrode having both excellent electrolyte solution injectability and excellent process adhesiveness with the conventional binder composition for a non-aqueous secondary battery electrode described above.

Accordingly, one objective of the present disclosure is to provide a binder composition for a non-aqueous secondary battery electrode and a slurry composition for a non-aqueous secondary battery electrode with which it is possible to form an electrode having excellent electrolyte solution injectability and process adhesiveness.

Another objective of the present disclosure is to provide an electrode for a non-aqueous secondary battery that has excellent electrolyte solution injectability and process adhesiveness and a non-aqueous secondary battery that includes this electrode.

Solution to Problem

The inventor conducted diligent investigation with the aim of solving the problems set forth above. The inventor discovered that an electrode having excellent electrolyte solution injectability and process adhesiveness can be formed by using a binder composition containing particles of a polymer that includes a block region composed of an aromatic vinyl monomer unit and has a tetrahydrofuran-insoluble content within a specific range, and, in this manner, the inventor completed the present disclosure.

Specifically, the present disclosure aims to advantageously solve the problems set forth above by disclosing a binder composition for a non-aqueous secondary battery electrode comprising a particulate polymer formed by a polymer that includes a block region composed of an aromatic vinyl monomer unit and has a tetrahydrofuran-insoluble content of not less than 5 mass % and not more than 40 mass %. Through inclusion of a particulate polymer formed by a polymer that includes a block region composed of an aromatic vinyl monomer unit and has a tetrahydrofuran-insoluble content of not less than 5 mass % and not more than 40 mass % in this manner, it is possible to improve electrolyte solution injectability and process adhesiveness of an electrode formed using the binder composition for a non-aqueous secondary battery electrode.

Note that a "monomer unit" of a polymer referred to in the present disclosure is "a repeating unit derived from the monomer that is included in a polymer obtained using the monomer". Moreover, when a polymer is said to "include a block region composed of a monomer unit" in the present disclosure, this means that "a section in which only monomer units of that type are bonded to one another in a row as repeating units is present in the polymer".

The "tetrahydrofuran-insoluble content" of a polymer referred to in the present disclosure can be measured by a method described in the EXAMPLES section of the present specification.

The presently disclosed binder composition for a non-aqueous secondary battery electrode preferably further comprises a water-soluble polymer that includes a hydrophilic group and has a weight-average molecular weight of not less than 15,000 and not more than 500,000. The inclusion of a hydrophilic group-containing water-soluble polymer having a weight-average molecular weight within the range set forth above can increase stability and improve coating density of a slurry composition for a non-aqueous secondary battery electrode produced using the binder composition for a non-aqueous secondary battery electrode and can inhibit aggregation of compounded components such as the particulate polymer during application of the slurry composition.

When a polymer is referred to as "water-soluble" in the present disclosure, this means that when 0.5 g of the polymer is dissolved in 100 g of water at a temperature of 25° C., insoluble content is less than 1.0 mass %. Moreover, the "weight-average molecular weight" of a water-soluble polymer referred to in the present disclosure can be measured by a method described in the EXAMPLES section of the present specification.

In the presently disclosed binder composition for a non-aqueous secondary battery electrode, content of the particulate polymer is preferably not less than 50 mass % and not more than 99.8 mass % of total content of the particulate polymer and the water-soluble polymer. When the proportion constituted by the content of the particulate polymer among the total of the content of the particulate polymer and the content of the water-soluble polymer is within the range set forth above, process adhesiveness of an electrode formed using the binder composition for a non-aqueous secondary battery electrode can be further improved. In addition, this can increase stability and improve coating density of a slurry composition for a non-aqueous secondary battery electrode produced using the binder composition and can inhibit aggregation of compounded components such as the particulate polymer during application of the slurry composition.

In the presently disclosed binder composition for a non-aqueous secondary battery electrode, the polymer may further include a coupling moiety.

Note that in the present disclosure, a "coupling moiety" in a polymer refers to "a moiety that is derived from a coupling agent and that is included in a polymer obtained through a coupling reaction using the coupling agent".

In the presently disclosed binder composition for a non-aqueous secondary battery electrode, the polymer is preferably obtained through cross-linking of a block polymer including an aliphatic conjugated diene monomer unit and a block region composed of an aromatic vinyl monomer unit. By using a polymer that is obtained through cross-linking of a block polymer including an aliphatic conjugated diene monomer unit and a block region composed of an aromatic vinyl monomer unit, electrolyte solution injectability of an electrode formed using the binder composition for a non-aqueous secondary battery electrode can be further improved.

The present disclosure also aims to advantageously solve the problems set forth above by disclosing a slurry composition for a non-aqueous secondary battery electrode comprising: an electrode active material; and any one of the binder compositions for a non-aqueous secondary battery electrode set forth above. The inclusion of any one of the binder compositions for a non-aqueous secondary battery electrode set forth above in this manner can improve electrolyte solution injectability and process adhesiveness of an electrode formed using the slurry composition for a non-aqueous secondary battery electrode.

The present disclosure also aims to advantageously solve the problems set forth above by disclosing an electrode for a non-aqueous secondary battery comprising an electrode mixed material layer formed using the slurry composition for a non-aqueous secondary battery electrode set forth above. When an electrode mixed material layer is formed using the slurry composition for a non-aqueous secondary battery electrode set forth above in this manner, an electrode having excellent electrolyte solution injectability and process adhesiveness can be obtained.

The present disclosure also aims to advantageously solve the problems set forth above by disclosing a non-aqueous secondary battery comprising a positive electrode, a negative electrode, a separator, and an electrolyte solution, wherein at least one of the positive electrode and the negative electrode is the electrode for a non-aqueous secondary battery set forth above. By using the electrode for a non-aqueous secondary battery set forth above, it is possible to efficiently produce a non-aqueous secondary battery having excellent battery characteristics such as output characteristics.

Advantageous Effect

Through the presently disclosed binder composition for a non-aqueous secondary battery electrode and slurry composition for a non-aqueous secondary battery electrode, it is possible to form an electrode having excellent electrolyte solution injectability and process adhesiveness.

Moreover, according to the present disclosure, it is possible to obtain an electrode for a non-aqueous secondary battery that has excellent electrolyte solution injectability and process adhesiveness and a non-aqueous secondary battery that includes this electrode.

DETAILED DESCRIPTION

The following provides a detailed description of embodiments of the present disclosure.

The presently disclosed binder composition for a non-aqueous secondary battery electrode can be used in production of the presently disclosed slurry composition for a non-aqueous secondary battery electrode. Moreover, a slurry composition for a non-aqueous secondary battery electrode produced using the presently disclosed binder composition for a non-aqueous secondary battery electrode can be used in production of an electrode of a non-aqueous secondary battery such as a lithium ion secondary battery. Furthermore, a feature of the presently disclosed non-aqueous secondary battery is that the presently disclosed electrode for a non-aqueous secondary battery formed using the presently disclosed slurry composition for a non-aqueous secondary battery electrode is used therein.

Note that the presently disclosed binder composition for a non-aqueous secondary battery electrode, slurry composition for a non-aqueous secondary battery electrode, and electrode for a non-aqueous secondary battery are preferably for a negative electrode, and the presently disclosed non-aqueous secondary battery is preferably a secondary battery in which the presently disclosed electrode for a non-aqueous secondary battery is used as a negative electrode.

Binder Composition for Non-Aqueous Secondary Battery Electrode

The presently disclosed binder composition for a non-aqueous secondary battery electrode contains a particulate polymer and may optionally further contain a water-soluble polymer and other components that can be compounded in binder compositions. Moreover, the presently disclosed binder composition for a non-aqueous secondary battery electrode normally further contains a dispersion medium such as water.

The presently disclosed binder composition can form an electrode having excellent electrolyte solution injectability and process adhesiveness as a result of the particulate polymer being formed by a polymer that includes a block region composed of an aromatic vinyl monomer unit and has a tetrahydrofuran (THF) insoluble content within a specific range.

Although it is not clear why a binder composition for a non-aqueous secondary battery electrode that can form an electrode having excellent electrolyte solution injectability and process adhesiveness is obtained, the reason is presumed to be as follows. As a result of the presently disclosed binder composition containing a particulate polymer formed by a polymer having a THF-insoluble content that is not less than a specific value, squashing of the particulate polymer in an electrode mixed material layer formed using the binder composition can be inhibited, and thus sufficient space for penetration of electrolyte solution can be ensured inside the electrode mixed material layer, and electrolyte solution injectability can be increased. Moreover, as a result of the particulate polymer contained in the binder composition including a block region composed of an aromatic vinyl monomer unit and having a THF-insoluble content that is not more than a specific value, excellent binding strength (process adhesiveness) can be displayed when an electrode and a separator are pressure bonded via the electrode mixed material layer.

Particulate Polymer

The particulate polymer is a component that functions as a binder. In an electrode mixed material layer formed using a slurry composition that contains the binder composition, the particulate polymer holds components such as an electrode active material so that they do not become detached from the electrode mixed material layer and enables adhesion of an electrode and a separator via the electrode mixed material layer.

The particulate polymer is in the form of water-insoluble particles that are formed by a specific polymer. Note that when particles are referred to as "water-insoluble" in the present disclosure, this means that when 0.5 g of the polymer is dissolved in 100 g of water at a temperature of 25° C., insoluble content is 90 mass % or more.

Polymer

The polymer forming the particulate polymer is a copolymer including a block region composed of an aromatic vinyl monomer unit (hereinafter, also referred to simply as the "aromatic vinyl block region") and a macromolecule chain portion in which repeating units other than aromatic vinyl monomer units are linked (hereinafter, also referred to simply as the "other region"). The aromatic vinyl block region and the other region are present adjacently to one another in the polymer. Also note that the polymer may include just one aromatic vinyl block region or may include a plurality of aromatic vinyl block regions. Likewise, the polymer may include just one other region or may include a plurality of other regions.

The polymer forming the particulate polymer is required to have a tetrahydrofuran-insoluble content of not less than 5 mass % and not more than 40 mass %.

Aromatic Vinyl Block Region

The aromatic vinyl block region is a region that only includes an aromatic vinyl monomer unit as a repeating unit as previously described.

Note that a single aromatic vinyl block region may be composed of just a single type of aromatic vinyl monomer unit or may be composed of a plurality of types of aromatic vinyl monomer units, but is preferably composed of just a single type of aromatic vinyl monomer unit.

Moreover, a single aromatic vinyl block region may include a coupling moiety (i.e., aromatic vinyl monomer units of a single aromatic vinyl block region may be linked with a coupling moiety interposed in-between).

In a case in which the polymer includes a plurality of aromatic vinyl block regions, the types and proportions of aromatic vinyl monomer units in the plurality of aromatic vinyl block regions may be the same or different, but are preferably the same.

Examples of aromatic vinyl monomers that can form an aromatic vinyl monomer unit of the aromatic vinyl block region in the polymer include aromatic monovinyl compounds such as styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually.

The proportion constituted by the aromatic vinyl monomer unit in the polymer when the amount of all repeating units (monomer units and structural units) in the polymer is taken to be 100 mass % is preferably 2 mass % or more, more preferably 10 mass % or more, and even more preferably 15 mass % or more, and is preferably 50 mass % or less, more preferably 45 mass % or less, and even more preferably 40 mass % or less. When the proportion constituted by the aromatic vinyl monomer unit in the polymer is 2 mass % or more, expression of tackiness by the polymer can be sufficiently inhibited. Consequently, even in a situation in which an electrode is subjected to a pressing process by roll pressing with the aim of densification of an electrode mixed material layer of the electrode, for example, the occurrence of faults and reduced productivity due to adhesion of the electrode mixed material layer to a roll can be inhibited. On the other hand, when the proportion constituted by the aromatic vinyl monomer unit in the polymer is 50 mass % or less, flexibility of the polymer is ensured, and process adhesiveness of an electrode can be further improved.

Note that the proportion constituted by the aromatic vinyl monomer unit in the polymer is normally the same as the proportion constituted by the aromatic vinyl block region in the polymer.

Other Region

The other region is a region that only includes a repeating unit other than an aromatic vinyl monomer unit (hereinafter, also referred to simply as the "other repeating unit") as a repeating unit as previously described.

Note that a single other region may be composed of one type of other repeating unit or may be composed of a plurality of types of other repeating units.

Moreover, a single other region may include a coupling moiety (i.e., other repeating units of a single other region may be linked with a coupling moiety interposed in-between).

Furthermore, the other region may include a cross-linked structure.

In a case in which the polymer includes a plurality of other regions, the types and proportions of other repeating units in the plurality of other regions may be the same or different.

Although no specific limitations are placed on the other repeating units composing the other region of the polymer, a structural unit obtained through cross-linking of an aliphatic conjugated diene monomer unit is preferably included from a viewpoint of further improving electrolyte solution injectability of an electrode, for example. In other words, the polymer forming the particulate polymer is preferably a polymer obtained through cross-linking of a block polymer that includes an aliphatic conjugated diene monomer unit and a block region composed of an aromatic vinyl monomer unit. Moreover, from a viewpoint of further improving process adhesiveness and electrolyte solution injectability of an electrode, it is more preferable that the polymer includes, as other repeating units, an aliphatic conjugated diene monomer unit and/or an alkylene structural unit, and also a structural unit obtained through cross-linking of an aliphatic conjugated diene monomer unit.

Examples of aliphatic conjugated diene monomers that can form the aliphatic conjugated diene monomer unit include conjugated diene compounds having a carbon number of 4 or more such as 1,3-butadiene, isoprene, 2,3-dimethyl-1,3-butadiene, and 1,3-pentadiene. One of these aliphatic conjugated diene monomers may be used individually, or two or more of these aliphatic conjugated diene monomers may be used in combination. Of these aliphatic conjugated diene monomers, 1,3-butadiene and isoprene are preferable, and isoprene is more preferable from a viewpoint of further improving process adhesiveness of an electrode.

The structural unit obtained through cross-linking of an aliphatic conjugated diene monomer unit can be introduced into the polymer through cross-linking of a block polymer including an aliphatic conjugated diene monomer unit and a block region composed of an aromatic vinyl monomer unit.

The cross-linking can be performed without any specific limitations using a radical initiator such as a redox initiator that is a combination of an oxidizing agent and a reducing agent, for example. Examples of oxidizing agents that can be used include organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide. Examples of reducing agents that can be used include compounds including a metal ion in a reduced state such as ferrous sulfate and copper naphthenate; sulfonic acid compounds such as sodium methanesulfonate; and amine compounds such as dimethylaniline. One of these organic peroxides and reducing agents may be used individually, or two or more of these organic peroxides and reducing agents may be used in combination.

Also note that the cross-linking may be carried out in the presence of a cross-linker such as a polyvinyl compound (divinylbenzene, etc.), a polyallyl compound (diallyl phthalate, triallyl trimellitate, diethylene glycol bis(allyl carbonate), etc.), or a glycol (ethylene glycol diacrylate, etc.). Moreover, the cross-linking can be performed by irradiation with active energy rays such as γ-rays.

The alkylene structural unit is a repeating unit composed only of an alkylene structure represented by a general formula —$C_nH_{2n}$— (n is an integer of 2 or more).

Although the alkylene structural unit may be linear or branched, the alkylene structural unit is preferably linear (i.e., is preferably a linear alkylene structural unit). Moreover, the alkylene structural unit preferably has a carbon number of 4 or more (i.e., n in the preceding general formula is preferably an integer of 4 or more).

No specific limitations are placed on the method by which the alkylene structural unit is introduced into the polymer. For example, a method in which a block polymer including an aliphatic conjugated diene monomer unit and a block region composed of an aromatic vinyl monomer unit is hydrogenated to convert the aliphatic conjugated diene monomer unit to an alkylene structural unit and obtain the polymer is preferable because production of the polymer is simple.

In a case in which an aliphatic conjugated diene monomer unit is converted to an alkylene structural unit by hydrogenation, the polymer forming the particulate polymer is preferably a polymer obtained through cross-linking of a hydrogenated block polymer that is obtained through hydrogenation of a block polymer including an aliphatic conjugated diene monomer unit and a block region composed of an aromatic vinyl monomer unit or a polymer obtained through hydrogenation of a cross-linked block polymer that is obtained through cross-linking of a block polymer including an aliphatic conjugated diene monomer unit and a block region composed of an aromatic vinyl monomer unit, and is more preferably a polymer obtained through cross-linking of a hydrogenated block polymer that is obtained through hydrogenation of a block polymer including an aliphatic conjugated diene monomer unit and a block region composed of an aromatic vinyl monomer unit.

Note that in a case in which an aliphatic conjugated diene monomer unit is converted to an alkylene structural unit by hydrogenation, the alkylene structural unit, which is a structural unit obtained through hydrogenation of the aliphatic conjugated diene monomer unit (i.e., is a hydrogenated aliphatic conjugated diene unit), is preferably a structural unit obtained through hydrogenation of an isoprene unit (i.e., is preferably a hydrogenated isoprene unit).

Selective hydrogenation of an aliphatic conjugated diene monomer unit as described above can be carried out by a commonly known method such as an oil-layer hydrogenation method or a water-layer hydrogenation method.

The total amount of an aliphatic conjugated diene monomer unit, a structural unit obtained through cross-linking of an aliphatic conjugated diene monomer unit, and an alkylene structural unit in the polymer forming the particulate polymer when the amount of all repeating units in the polymer is taken to be 100 mass % is preferably 50 mass % or more, more preferably 65 mass % or more, and even more preferably 70 mass % or more, and is preferably 98 mass % or less, and more preferably 95 mass % or less. In other words, the proportion constituted by an aliphatic conjugated diene monomer unit in the block polymer including an aliphatic conjugated diene monomer unit and a block region composed of an aromatic vinyl monomer unit (i.e., the block polymer that undergoes hydrogenation and/or cross-linking) when the amount of all repeating units in the block polymer is taken to be 100 mass % is preferably 50 mass % or more, more preferably 65 mass % or more, and even more preferably 70 mass % or more, and is preferably 98 mass % or less, and more preferably 95 mass % or less.

When the proportion constituted by an aliphatic conjugated diene monomer unit, a structural unit obtained through cross-linking of an aliphatic conjugated diene monomer unit, and an alkylene structural unit in the polymer is 50 mass % or more, process adhesiveness of an electrode can be further improved. On the other hand, when the proportion constituted by an aliphatic conjugated diene monomer unit, a structural unit obtained through cross-linking of an aliphatic conjugated diene monomer unit, and an alkylene structural unit in the polymer is 98 mass % or less, it is possible to ensure flexibility of the polymer and further improve process adhesiveness of an electrode, and also to sufficiently inhibit expression of tackiness by the polymer.

Note that the other region of the polymer may include repeating units other than an aliphatic conjugated diene monomer unit, a structural unit obtained through cross-linking of an aliphatic conjugated diene monomer unit, and an alkylene structural unit. Specifically, the other region of the polymer may include other monomer units such as a nitrile group-containing monomer unit (acrylonitrile unit, methacrylonitrile unit, etc.), a (meth)acrylic acid ester monomer unit (acrylic acid alkyl ester unit, methacrylic acid alkyl ester unit, etc.), and an acidic group-containing monomer unit (carboxyl group-containing monomer unit, sulfo group-containing monomer unit, phosphate group-containing monomer unit, etc.). Note that in the present disclosure, "(meth)acrylic acid" is used to indicate "acrylic acid" and/or "methacrylic acid". Examples of (meth)acrylic acid ester monomers that can form a (meth)acrylic acid ester monomer unit, carboxyl group-containing monomers that can form a carboxyl group-containing monomer unit, sulfo group-containing monomers that can form a sulfo group-containing monomer unit, and phosphate group-containing monomers that can form a phosphate group-containing monomer unit include the same monomers as for the subsequently described water-soluble polymer.

Other monomer units such as a nitrile group-containing monomer unit, a (meth)acrylic acid ester monomer unit, and an acidic group-containing monomer unit can be introduced into the polymer by any polymerization method, such as graft polymerization, without any specific limitations. Specifically, a polymer including another monomer unit can be obtained by, for example, performing graft polymerization of another monomer such as a nitrile group-containing monomer, a (meth)acrylic acid ester monomer, or an acidic group-containing monomer and optionally performing cross-linking with respect to a trunk portion that is a polymer obtained through hydrogenation of a block polymer including an aliphatic conjugated diene monomer unit and a block region composed of an aromatic vinyl monomer unit. Alternatively, a polymer including another monomer unit can be obtained by, for example, performing graft polymerization of another monomer such as a nitrile group-containing monomer, a (meth)acrylic acid ester monomer, or an acidic group-containing monomer with respect to a trunk portion that is a block polymer including an aliphatic conjugated diene monomer unit and a block region composed of an aromatic vinyl monomer unit, and then optionally performing cross-linking and/or hydrogenation with respect to a graft polymer obtained through the graft polymerization.

Tetrahydrofuran-Insoluble Content

The tetrahydrofuran-insoluble content of the polymer forming the particulate polymer is required to be not less than 5 mass % and not more than 40 mass %, is preferably 8 mass % or more, and more preferably 15 mass % or more, and is preferably 38 mass % or less, and more preferably 35 mass % or less. If the tetrahydrofuran-insoluble content of the polymer is less than 5 mass %, electrolyte solution injectability of an electrode decreases. On the other hand, electrolyte solution injectability of an electrode can be sufficiently increased when the tetrahydrofuran-insoluble content of the polymer is not less than any of the lower limits set forth above. Moreover, if the tetrahydrofuran-insoluble content of the polymer is more than 40 mass %, process adhesiveness of an electrode decreases. On the other hand, process adhesiveness of an electrode can be sufficiently increased when the tetrahydrofuran-insoluble content of the polymer is not more than any of the upper limits set forth above.

Note that the tetrahydrofuran-insoluble content of the polymer can be adjusted by altering the chemical composition of the polymer. For example, the tetrahydrofuran-insoluble content of the polymer can be increased by introducing a cross-linked structure into the polymer.

Production Method of Particulate Polymer

The particulate polymer formed by the polymer described above can be produced, for example, through a step of block polymerizing the previously described monomers in an organic solvent to obtain a solution of a block polymer including an aromatic vinyl block region (block polymer solution production step), a step of adding water to the obtained solution of the block polymer and performing emulsification to form particles of the block polymer (emulsification step), and a step of performing cross-linking with respect to the block polymer that has been formed into particles so as to obtain a water dispersion of a particulate polymer formed by a specific polymer (cross-linking step).

Block Polymer Solution Production Step

No specific limitations are placed on the method of block polymerization in the block polymer solution production step. For example, the block polymer can be produced by polymerizing a first monomer component, adding a second monomer component, differing from the first monomer component, to the resultant solution and performing polymerization thereof, and further repeating addition and polymerization of monomer components as necessary. The organic solvent used as the reaction solvent is not specifically limited and can be selected as appropriate depending on the types of monomers and so forth.

The block polymer obtained through block polymerization as described above is preferably subjected to a coupling reaction using a coupling agent in advance of the subsequently described emulsification step. The coupling reaction can, for example, cause the terminals of diblock structures contained in the block polymer to bond to one another through the coupling agent to thereby convert the diblock structures to a triblock structure (i.e., the diblock content can be reduced).

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable. Note that through the coupling reaction using a coupling agent, a coupling moiety derived from the coupling agent is introduced into a macromolecule chain (for example, a triblock structure) of the block polymer.

The block polymer solution obtained after the block polymerization and the optional coupling reaction described above can be subjected to the subsequently described emulsification step as obtained, or may be subjected to the emulsification step after performing hydrogenation and/or graft polymerization of the block polymer as necessary as previously described.

Emulsification Step

Although no specific limitations are placed on the method of emulsification in the emulsification step, a method involving phase-inversion emulsification of a preliminary mixture of the solution of the block polymer obtained by the previously described block polymer solution production step and an aqueous solution of an emulsifier is preferable, for example. The phase-inversion emulsification can be carried out, for example, using a known emulsifier and a known emulsifying and dispersing device. Specific examples of emulsifying and dispersing devices that can be used include, but are not specifically limited to, batch emulsifying and dispersing devices such as a Homogenizer (product name; produced by IKA), a Polytron (product name; produced by Kinematica AG), and a TK Auto Homo Mixer (product name; produced by Tokushu Kika Kogyo Co., Ltd.); continuous emulsifying and dispersing devices such as a TK Pipeline-Homo Mixer (product name; produced by Tokushu Kika Kogyo Co., Ltd.), a Colloid Mill (product name; produced by Shinko Pantec Co., Ltd.), a Thrasher (product name; produced by Nippon Coke & Engineering Co., Ltd.), a Trigonal Wet Fine Grinding Mill (product name; produced by Mitsui Miike Chemical Engineering Machinery Co., Ltd.), a Cavitron (product name; produced by EUROTEC Ltd.), a Milder (product name; produced by Pacific Machinery & Engineering Co., Ltd.), and a Fine Flow Mill (product name; produced by Pacific Machinery & Engineering Co., Ltd.); high-pressure emulsifying and dispersing devices such as a Microfluidizer (product name; produced by Mizuho Industrial Co., Ltd.), a Nanomizer (product name; produced by Nanomizer Inc.), and an APV Gaulin (product name; produced by Gaulin); membrane emulsifying and dispersing devices such as a Membrane Emulsifier (product name; produced by Reica Co., Ltd.); vibratory emulsifying and dispersing devices such as a Vibro Mixer (product name; produced by Reica Co., Ltd.); and ultrasonic emulsifying and dispersing devices such as an Ultrasonic Homogenizer (product name; produced by Branson). The conditions (processing temperature, processing time, etc.) of the emulsifying operation performed using the emulsifying and dispersing device are not specifically limited and may be selected as appropriate so as to obtain a desired dispersion state.

A water dispersion of the block polymer that has been formed into particles can then be obtained by, for example, using a known method to remove organic solvent from the emulsion obtained after phase-inversion emulsification as necessary.

Cross-Linking Step

Although no specific limitations are placed on the method of cross-linking in the cross-linking step, a method using a radical initiator such as a redox initiator to perform cross-linking in the presence or absence of a cross-linker is preferable, for example. Note that in a case in which a block polymer that has been hydrogenated is to be cross-linked, the cross-linking is preferably carried out in the presence of a cross-linker.

The cross-linking conditions can be adjusted in accordance with the chemical composition of the block polymer, the desired tetrahydrofuran-insoluble content, and so forth.

In the cross-linking step, it is possible to obtain a water dispersion of a particulate polymer formed by a polymer that includes a block region composed of an aromatic vinyl monomer unit and has a tetrahydrofuran-insoluble content of not less than 5 mass % and not more than 40 mass %.

Water-Soluble Polymer

The water-soluble polymer is a component that can cause good dispersion of compounded components such as the particulate polymer set forth above in an aqueous medium. Therefore, the inclusion of the water-soluble polymer in the binder composition optimizes the structure of an electrode mixed material layer formed using a slurry composition that contains the binder composition and can further increase electrolyte solution injectability of an electrode.

The water-soluble polymer is preferably a water-soluble polymer that includes a hydrophilic group and has a weight-average molecular weight of not less than 15,000 and not more than 500,000. Although no specific limitations are placed on the water-soluble polymer, the water-soluble polymer is preferably a synthetic macromolecule, and is more preferably an addition polymer that is produced by addition polymerization. Note that the water-soluble polymer may be in the form of a salt (salt of a water-soluble polymer). In other words, the term "water-soluble polymer" as used in the present disclosure is also inclusive of a salt of the water-soluble polymer.

Hydrophilic Group

Examples of hydrophilic groups that can be included in the water-soluble polymer include a carboxyl group, a sulfo group, a phosphate group, and a hydroxyl group. The water-soluble polymer may include just one of these types of hydrophilic groups or may include two or more of these types of hydrophilic groups. Of these hydrophilic groups, a carboxyl group and a sulfo group are preferable, and a carboxyl group is more preferable from a viewpoint of increasing stability and improving coating density of a slurry composition, inhibiting aggregation of the particulate polymer and the like during application of the slurry composition, and further improving handleability of an electrode.

No specific limitations are placed on the method by which a hydrophilic group is introduced into the water-soluble polymer. Although a water-soluble polymer including a hydrophilic group-containing monomer unit may be obtained by producing a polymer through addition polymerization of a monomer that includes any of the hydrophilic groups described above (hydrophilic group-containing monomer) or a water-soluble polymer including any of the hydrophilic groups described above may be obtained through modification (for example, terminal modification) of any polymer, the former of these methods is preferable.

Hydrophilic Group-Containing Monomer Unit

The water-soluble polymer preferably includes at least one selected from the group consisting of a carboxyl group-containing monomer unit, a sulfo group-containing monomer unit, a phosphate group-containing monomer unit, and a hydroxyl group-containing monomer unit as a hydrophilic group-containing monomer unit, more preferably includes either or both of a carboxyl group-containing monomer unit and a sulfo group-containing monomer unit as a hydrophilic group-containing monomer unit, and even more preferably includes a carboxyl group-containing monomer unit as a hydrophilic group-containing monomer unit from a viewpoint of increasing stability and improving coating density of a slurry composition, inhibiting aggregation of the particulate polymer and the like during application of the slurry composition, and further improving handleability of an electrode. Note that the water-soluble polymer may include just one of the types of hydrophilic group-containing monomer units described above or may include two or more of the types of hydrophilic group-containing monomer units described above.

Examples of carboxyl group-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as butyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, dimethylmaleic anhydride, and citraconic anhydride.

Moreover, an acid anhydride that produces a carboxyl group through hydrolysis can be used as a carboxyl group-containing monomer.

Furthermore, an ethylenically unsaturated polybasic carboxylic acid such as butene tricarboxylic acid or a partial ester of an ethylenically unsaturated polybasic carboxylic acid such as monobutyl fumarate or mono-2-hydroxypropyl maleate can be used as a carboxyl group-containing monomer.

Examples of sulfo group-containing monomers that can form a sulfo group-containing monomer unit include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers that can form a phosphate group-containing monomer unit include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a\text{—}COO\text{—}(C_qH_{2q}O)_p\text{—}H$ (where p represents an integer of 2 to 9, q represents an integer of 2 to 4, and $R^a$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide.

The proportion constituted by the hydrophilic group-containing monomer unit in the water-soluble polymer when the amount of all repeating units in the water-soluble polymer is taken to be 100 mass % is preferably 10 mass % or more, more preferably 20 mass % or more, even more preferably 30 mass % or more, and particularly preferably 35 mass % or more. When the proportion constituted by the hydrophilic group-containing monomer unit in the water-soluble polymer is 10 mass % or more, it is possible to increase stability and improve coating density of a slurry composition, and also to inhibit aggregation of the particulate polymer and the like during application of the slurry composition and further improve handleability of an electrode. Note that no specific limitations are placed on the upper limit for the proportion constituted by the hydrophilic group-containing monomer unit in the water-soluble polymer, and this proportion can be 100 mass % or less.

Other Monomer Units

The water-soluble polymer may include monomer units other than the hydrophilic group-containing monomer unit described above (i.e., other monomer units). No specific limitations are placed on other monomers that can form other monomer units included in the water-soluble polymer so long as they are copolymerizable with a hydrophilic group-containing monomer such as described above. Examples of such other monomers include (meth)acrylic acid ester monomers, fluorine-containing (meth)acrylic acid ester monomers, and cross-linkable monomers.

Monomers given as examples in JP 2015-70245 A, for example, can be used as (meth)acrylic acid ester monomers, fluorine-containing (meth)acrylic acid ester monomers, and cross-linkable monomers.

One other monomer may be used individually, or two or more other monomers may be used in combination.

Production Method of Water-Soluble Polymer

The water-soluble polymer can be produced, for example, through polymerization of a monomer composition containing the monomers described above, carried out in an aqueous solvent such as water. In the polymerization, the proportion in which each monomer is contained in the monomer composition can be set in accordance with the proportion in which each monomer unit is included in the water-soluble polymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Additives such as emulsifiers, dispersants, polymerization initiators, polymerization aids, and molecular weight modifiers used in the polymerization may be the same as typically used. The amounts of these additives may also be the same as typically used. The polymerization conditions can be adjusted as appropriate depending on the polymerization method, the type of polymerization initiator, and so forth.

Weight-Average Molecular Weight

The weight-average molecular weight of the water-soluble polymer is preferably 15,000 or more, more preferably 20,000 or more, and even more preferably 25,000 or more, and is preferably 500,000 or less, more preferably 400,000 or less, and even more preferably 350,000 or less. When the weight-average molecular weight of the water-soluble polymer is 15,000 or more, stability of a slurry composition can be increased, and coating density of the slurry composition can be improved. Moreover, when the weight-average molecular weight of the water-soluble polymer is 500,000 or less, it is possible to inhibit aggregation of the particulate polymer and the like during application of a slurry composition, and to further increase electrolyte solution injectability and process adhesiveness of an electrode.

Note that the weight-average molecular weight of the water-soluble polymer can be adjusted by altering the amounts and types of polymerization initiator and molecular weight modifier.

Content Ratio of Particulate Polymer and Water-Soluble Polymer

No specific limitations are placed on the content ratio (in terms of solid content) of the particulate polymer and the water-soluble polymer in the presently disclosed binder composition. For example, the content of the particulate polymer in the presently disclosed binder composition is preferably 50 mass % or more, more preferably 60 mass % or more, even more preferably 70 mass % or more, and particularly preferably 90 mass % or more of the total content (100 mass %) of the particulate polymer and the water-soluble polymer, and is preferably 99.8 mass % or less, and more preferably 99.6 mass % or less of the total content of the particulate polymer and the water-soluble polymer. When the proportion constituted by the content of the particulate polymer among the total content of the particulate polymer and the water-soluble polymer is 50 mass % or more, is it possible to inhibit aggregation of the particulate polymer and the like during application of a slurry composition and also to further improve process adhesiveness of an electrode. On the other hand, when the proportion constituted by the content of the particulate polymer among the total content of the particulate polymer and the water-soluble polymer is 99.8 mass % or less, it is possible to increase stability and improve coating density of a slurry composition while also further improving process adhesiveness of an electrode.

Aqueous Medium

The aqueous medium contained in the presently disclosed binder composition is not specifically limited so long as it contains water, and may be an aqueous solution or a mixed solution of water and a small amount of an organic solvent.

Other Components

The presently disclosed binder composition can contain components other than those described above (i.e., other components). For example, the binder composition may contain a known particulate binder (styrene butadiene random copolymer, acrylic polymer, etc.) other than the previously described particulate polymer. Moreover, the binder composition may contain known additives. Examples of such known additives include antioxidants such as 2,6-di-tert-butyl-p-cresol, defoamers, and dispersants (excluding those corresponding to the previously described water-soluble polymer). One other component may be used individually, or two or more other components may be used in combination in a freely selected ratio.

Production Method of Binder Composition

The presently disclosed binder composition can be produced, without any specific limitations, by mixing the particulate polymer and the optionally used water-soluble polymer and/or other components in the presence of the aqueous medium. Note that in a case in which a dispersion liquid of the particulate polymer and/or an aqueous solution of the water-soluble polymer is used in production of the binder composition, liquid content of the dispersion liquid and/or the aqueous solution may be used as the aqueous medium of the binder composition.

Slurry Composition for Non-Aqueous Secondary Battery Electrode

The presently disclosed slurry composition is a composition that is for use in formation of an electrode mixed material layer of an electrode, that contains the binder composition set forth above, and that further contains an electrode active material. In other words, the presently disclosed slurry composition contains the previously described particulate polymer, an electrode active material, and an aqueous medium, and optionally further contains a water-soluble polymer and other components. As a result of the presently disclosed slurry composition containing the binder composition set forth above, an electrode including an electrode mixed material layer that is formed from the slurry composition has excellent electrolyte solution injectability and process adhesiveness.

Binder Composition

The presently disclosed binder composition set forth above, which contains a particulate polymer formed by a specific polymer, is used as the binder composition.

No specific limitations are placed on the amount of the binder composition in the slurry composition. For example, the amount of the binder composition can be set as an amount such that the amount of the particulate polymer is not less than 0.5 parts by mass and not more than 15 parts by mass, in terms of solid content, per 100 parts by mass of the electrode active material.

Electrode Active Material

Known electrode active materials that are used in secondary batteries can be used without any specific limitations as the electrode active material. Specifically, examples of electrode active materials that can be used in an electrode mixed material layer of a lithium ion secondary battery, which is one example of a secondary battery, include the electrode active materials described below, but are not specifically limited thereto.

Positive Electrode Active Material

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

Negative Electrode Active Material

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, oxides such as lithium titanate can be used.

One of the negative electrode active materials described above may be used individually, or two or more of the negative electrode active materials described above may be used in combination.

Other Components

Examples of other components that can be compounded in the slurry composition include, but are not specifically limited to, conductive materials and the same other components as can be compounded in the presently disclosed binder composition. One other component may be used individually, or two or more other components may be used in combination in a freely selected ratio.

Production of Slurry Composition

No specific limitations are placed on the method by which the slurry composition is produced.

For example, the slurry composition can be produced by mixing the binder composition, the electrode active material, and other components that are used as necessary, in the presence of an aqueous medium.

Note that the aqueous medium used in production of the slurry composition also includes the aqueous medium that was contained in the binder composition. The method of mixing is not specifically limited and may involve mixing using a typically used stirrer or disperser.

Electrode for Non-Aqueous Secondary Battery

The presently disclosed electrode for a non-aqueous secondary battery includes an electrode mixed material layer formed using the slurry composition for a non-aqueous secondary battery electrode set forth above. Therefore, the electrode mixed material layer is formed by a dried product of the slurry composition set forth above, normally contains an electrode active material and a component derived from a particulate polymer, and optionally contains a water-soluble polymer and other components. Note that components contained in the electrode mixed material layer are components that were contained in the slurry composition for a non-aqueous secondary battery electrode, and the preferred ratio of these components in the electrode mixed material layer is also the same as the preferred ratio of the components in the slurry composition. Although the particulate polymer is in a particulate form in the slurry composition, the particulate polymer may be in a particulate form or in any other form in the electrode mixed material layer formed using the slurry composition.

The presently disclosed electrode for a non-aqueous secondary battery has excellent electrolyte solution injectability and process adhesiveness as a result of the electrode mixed material layer being formed using the slurry composition for a non-aqueous secondary battery electrode set forth above.

Production of Electrode for Non-Aqueous Secondary Battery

Examples of methods by which the electrode mixed material layer of the presently disclosed electrode for a non-aqueous secondary battery can be formed include:

(1) a method in which the presently disclosed slurry composition is applied onto the surface of a current collector and is then dried;

(2) a method in which a current collector is immersed in the presently disclosed slurry composition and is then dried; and (3) a method in which the presently disclosed slurry composition is applied onto a releasable substrate and is dried to produce an electrode mixed material layer that is then transferred onto the surface of a current collector.

Of these methods, method (1) is particularly preferable since it allows simple control of the thickness of the electrode mixed material layer. In more detail, method (1) includes a step of applying the slurry composition onto a current collector (application step) and a step of drying the slurry composition that has been applied onto the current collector to form an electrode mixed material layer on the current collector (drying step).

Application Step

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

Drying Step

The slurry composition on the current collector can be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode for a non-aqueous secondary battery that includes the current collector and the electrode mixed material layer.

After the drying step, the electrode mixed material layer may be further subjected to a pressing process by mold pressing, roll pressing, or the like. The pressing process can improve close adherence between the electrode mixed material layer and the current collector and can further increase the density of the electrode mixed material layer. Furthermore, in a case in which the electrode mixed material layer contains a curable polymer, the polymer is preferably cured after the electrode mixed material layer has been formed.

Non-Aqueous Secondary Battery

The presently disclosed non-aqueous secondary battery includes a positive electrode, a negative electrode, an electrolyte solution, and a separator, wherein the electrode for a non-aqueous secondary battery set forth above is used as at least one of the positive electrode and the negative electrode. As a result of the presently disclosed non-aqueous secondary battery being produced by using the electrode for a non-aqueous secondary battery set forth above as at least one of the positive electrode and the negative electrode, the occurrence of faults during the production process is inhibited, and the non-aqueous secondary battery can display excellent battery characteristics.

Although the following describes, as one example, a case in which the secondary battery is a lithium ion secondary battery, the presently disclosed secondary battery is not limited to the following example.

Electrodes

Examples of electrodes other than the presently disclosed electrode for a non-aqueous secondary battery set forth above that can be used in the presently disclosed non-aqueous secondary battery include, but are not specifically limited to, known electrodes that are used in production of secondary batteries. Specifically, an electrode obtained by forming an electrode mixed material layer on a current collector by a known production method, for example, can be used as an electrode other than the presently disclosed electrode for a non-aqueous secondary battery set forth above.

Electrolyte Solution

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that can be used include $LiPF_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, and (C$_2$F$_5$SO$_2$)NLi. Of these lithium salts, LiPF$_6$, LiClO$_4$, and CF$_3$SO$_3$Li are preferable as they readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

Separator

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

The presently disclosed secondary battery can be produced by, for example, stacking the positive electrode and the negative electrode with the separator in-between, performing rolling, folding, or the like of the resultant laminate in accordance with the battery shape as necessary, placing the laminate in a battery container, injecting the electrolyte solution into the battery container, and sealing the battery container. The electrode for a non-aqueous secondary battery set forth above is used as at least one of the positive electrode and the negative electrode in the presently disclosed non-aqueous secondary battery, and is preferably used as the negative electrode. The presently disclosed non-aqueous secondary battery may be provided with an overcurrent preventing device such as a fuse or a PTC device, an expanded metal, a lead plate, or the like, as necessary, in order to prevent pressure increase inside the secondary battery and occurrence of overcharging or overdischarging. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the tetrahydrofuran-insoluble content of a polymer forming a particulate polymer, the weight-average molecular weight of a water-soluble polymer, and the process adhesiveness and electrolyte solution injectability of an electrode were evaluated by the following methods.

Tetrahydrofuran (THF) Insoluble Content of Polymer

An obtained water dispersion of a particulate polymer was dried in an environment having a humidity of 50% and a temperature of 23° C. to 25° C. to form a film of approximately 0.3 mm in thickness. The resultant film was cut into 3 mm square and was precisely weighed.

The mass of the film piece obtained by this cutting was taken to be w0. The film piece was immersed in 100 g of tetrahydrofuran (THF) at 25° C. for 24 hours. Thereafter, the film piece was pulled out of the THF, was vacuum dried at 105° C. for 3 hours, and then the mass w1 of insoluble matter was measured.

The THF-insoluble content (mass %) was calculated by the following formula.

$$\text{THF-insoluble content(mass \%)}=(w1/w0)\times 100$$

Weight-Average Molecular Weight of Water-Soluble Polymer

A prepared aqueous solution of a water-soluble polymer was diluted to 0.05 mass % with the eluent indicated below to obtain a measurement sample. The obtained measurement sample was then analyzed by gel permeation chromatography (GPC) under the conditions indicated below to determine the weight-average molecular weight of the water-soluble polymer.

GPC apparatus: HLC-8220 produced by Tosoh Corporation

Separation column: Shodex OHpak SB-807HQ, SB-806M HQ produced by Showa Denko K.K. (temperature: 40° C.)

Eluent: 0.1 mol/L sodium nitrate (NaNO$_3$) aqueous solution

Flow rate: 0.5 mL/min

Standard sample: Standard polyethylene oxide

Process Adhesiveness

The process adhesiveness of a negative electrode and a separator via a negative electrode mixed material layer was evaluated by measuring the peel strength as described below.

First, the negative electrode and the separator were each cut to 50 mm in length and 10 mm in width. The cut negative electrode and separator were then stacked with the negative electrode mixed material layer in-between. The resultant laminate was pressed by a flat plate press under conditions of a temperature of 70° C. and a pressure of 20 MPa to obtain a test specimen.

The test specimen was placed with the surface at the current collector side of the negative electrode facing downward, and cellophane tape (prescribed by JIS Z1522) was affixed to the surface of the negative electrode. Note that the cellophane tape was secured to a horizontal test stage in advance. Subsequently, the stress at the time when the separator was peeled by pulling one end of the separator vertically upward at a pulling speed of 50 mm/min was measured. This measurement was performed three times. An average value of the measured stresses (three in total) was calculated as the peel strength (N/m), and then the process adhesiveness of the negative electrode and the separator via the negative electrode mixed material layer was evaluated by the following standard. A larger peel strength indicates better process adhesiveness.

A: Peel strength of 2 N/m or more
B: Peel strength of not less than 1 N/m and less than 2 N/m
C: Peel strength of less than 1 N/m Electrolyte Solution Injectability After dripping 1 μL of electrolyte solution (solvent: ethylene carbonate (EC)/ethyl methyl carbonate (EMC)=3/7 (volume ratio); electrolyte: $LiPF_6$ of 1 M in concentration) onto a surface at a negative electrode mixed material layer side of a produced negative electrode (negative electrode mixed material layer density: 1.75 g/cm$^3$), the time taken from this dripping until the electrolyte solution penetrated into the negative electrode mixed material layer and liquid on the surface disappeared (penetration time) was measured and was evaluated by the following standard. A shorter penetration time indicates that there will be better electrolyte solution injectability during production of a secondary battery using the negative electrode.

A: Penetration time of less than 300 s
B: Penetration time of not less than 300 s and less than 450 s
C: Penetration time of 450 s or more Example 1

Production of Particulate Polymer

Production of Cyclohexane Solution of Block Polymer

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of the reaction liquid (containing 30.0 parts of polymer component) and was mixed therewith. The resultant mixed solution was gradually dripped into hot water of 85° C. to 95° C. so as to volatilize the solvent and obtain a precipitate. This precipitate was pulverized and was then hot-air dried at 85° C. to collect a dried product containing a block polymer.

The dried product that was collected was then dissolved in cyclohexane to produce a block polymer solution in which the concentration of the block polymer was 25%.

Phase-Inversion Emulsification

A mixture obtained by mixing sodium alkylbenzenesulfonate, sodium polyoxyethylene alkyl sulfosuccinate, and sodium polyoxyethylene alkyl ether sulfate in a ratio of 1:1:1 (by mass) was dissolved in deionized water to produce an aqueous solution of 5% in concentration.

A tank was charged with 500 g of the obtained block polymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause phase-inversion emulsification of the preliminary mixture and obtain an emulsion.

Cyclohexane in the obtained emulsion was subsequently vacuum evaporated in a rotary evaporator. Thereafter, the emulsion resulting from this evaporation was left to separate for 1 day in a chromatographic column equipped with a stop-cock, and the lower layer portion after separation was removed to perform concentration.

Finally, the upper layer portion was filtered through a 100-mesh screen to obtain a water dispersion (block polymer latex) containing a particulate block polymer.

Cross-Linking

The obtained block polymer latex was diluted by adding 850 parts of distilled water per 100 parts of the block polymer latex. The diluted block polymer latex was loaded into a polymerization reactor that was equipped with a stirrer and had been purged with nitrogen, and was then heated to a temperature of 30° C. under stirring.

A separate vessel was used to produce a solution containing 0.01 parts of ferrous sulfate (produced by Chubu Chelest Co., Ltd.; product name: Frost Fe) as a reducing agent. After adding the obtained solution into the polymerization reactor, 0.5 parts of 1,1,3,3-tetramethylbutyl hydroperoxide (produced by NOF Corporation; product name: PEROCTA H) was added as an oxidizing agent, and a reaction was carried out at 30° C. for 1 hour and then at 70° C. for 2 hours.

This yielded a water dispersion of a particulate polymer formed by a polymer obtained through cross-linking of the block polymer.

The obtained water dispersion of the particulate polymer was used to measure the THF-insoluble content of the polymer forming the particulate polymer. The result is shown in Table 1.

Preparation of Water-Soluble Polymer

An aqueous solution of polymethacrylic acid (produced by Wako Pure Chemical Industries, Ltd.; weight-average molecular weight: 100,000) was prepared.

The prepared aqueous solution was used to measure the weight-average molecular weight of the water-soluble polymer. The result is shown in Table 1.

Production of Binder Composition for Non-Aqueous Secondary Battery Negative Electrode A mixture was obtained by loading the water dispersion of the particulate polymer and the aqueous solution of the water-soluble polymer that were obtained as described above into a vessel such that the mass ratio in terms of solid content was particulate polymer:water-soluble polymer=99:1. The obtained mixture was stirred for 1 hour using a stirrer (produced by SHINTO Scientific Co., Ltd.; product name: Three-One Motor) to obtain a binder composition for a negative electrode.

Production of Slurry Composition for Non-Aqueous Secondary Battery Negative Electrode A mixture was obtained by adding 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.0 parts in terms of solid content of the binder composition produced as described above were added to the obtained mixed liquid, and the final solid content concentration was adjusted to 48%. Further mixing was performed for 10 minutes, and then a defoaming process was carried out under reduced pressure to yield a slurry composition for a negative electrode having good fluidity.

Formation of Negative Electrode

The obtained slurry composition for a negative electrode was applied onto copper foil (current collector) of 15 μm in thickness by a comma coater such as to have a coating weight after drying of 11 mg/cm$^2$. The applied slurry composition was dried by conveying the copper foil inside a 60° C. oven for 2 minutes at a speed of 0.5 m/min. Thereafter, 2 minutes of heat treatment was performed at 120° C. to obtain a negative electrode web.

The negative electrode web was rolled by roll pressing to obtain a negative electrode having a negative electrode mixed material layer density of 1.75 g/cm$^3$.

The obtained negative electrode was used to evaluate electrolyte solution injectability. The result is shown in Table 1.

Formation of Positive Electrode

A slurry composition for a positive electrode was obtained by combining 100 parts of LiCoO$_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a positive electrode was applied onto aluminum foil (current collector) of 20 μm in thickness by a comma coater such as to have a coating weight after drying of 23 mg/cm$^2$. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode having a positive electrode mixed material layer density of 4.0 g/cm$^3$.

Preparation of Separator

A separator made from a single layer of polypropylene (produced by Celgard, LLC.; product name: Celgard 2500) was prepared as a separator.

Note that this separator and the negative electrode obtained as described above were used to evaluate process adhesiveness. The result is shown in Table 1.

Production of Lithium Ion Secondary Battery

A rectangle of 49 cm×5 cm was cut out from the obtained positive electrode and was placed with the surface at the positive electrode mixed material layer side thereof facing upward. A separator that had been cut out as 120 cm×5.5 cm was arranged on the positive electrode mixed material layer such that the positive electrode was positioned at a longitudinal direction left-hand side of the separator. In addition, a rectangle of 50 cm×5.2 cm was cut out from the obtained negative electrode and was arranged on the separator such that the surface at the negative electrode mixed material layer side thereof faced toward the separator and such that the negative electrode was positioned at a longitudinal direction right-hand side of the separator. The resultant laminate was wound by a winding machine to obtain a roll. The roll was enclosed in an aluminum packing case serving as a battery case, electrolyte solution (solvent:ethylene carbonate/diethyl carbonate/vinylene carbonate=68.5/30/1.5 (volume ratio); electrolyte: LiPF$_6$ of 1 M in concentration) was injected such that no air remained, and an opening of the aluminum packing case was closed by heat sealing at 150° C. to produce a wound lithium ion secondary battery having a capacity of 800 mAh. Good operation of the lithium ion secondary battery was confirmed.

Example 2

A particulate polymer, a binder composition for a negative electrode, a slurry composition for a negative electrode, a negative electrode, a positive electrode, a separator, and a lithium ion secondary battery were prepared or produced in the same way as in Example 1 with the exception that in production of the binder composition for a non-aqueous secondary battery negative electrode, polymethacrylic acid (produced by Wako Pure Chemical Industries, Ltd.) was not used as a water-soluble polymer, and the water dispersion of the particulate polymer was used in that form as the binder composition for a non-aqueous secondary battery negative electrode. Evaluations were conducted in the same manner as in Example 1. The results are shown in Table 1.

Example 3

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that the amount of 1,1,3,3-tetramethylbutyl hydroperoxide (product name: PEROCTA H; produced by NOF Corporation) was changed to 0.6 parts when performing cross-linking in production of the particulate polymer. Evaluations were conducted in the same manner as in Example 1. The results are shown in Table 1.

Example 4

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that production of a cyclohexane solution of a block polymer and cross-linking were performed as described below in production of the particulate polymer. Evaluations were conducted in the same manner as in Example 1. The results are shown in Table 1.

Production of Cyclohexane Solution of Block Polymer

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals.

Next, the resultant mixed solution was transferred to a pressure-resistant reactor including a stirring device, and then 4.0 parts of a silica-alumina-supported nickel catalyst (E22U produced by Nikki Chemical Co., Ltd.; amount of supported nickel: 60%) as a hydrogenation catalyst and 100 parts of dehydrated cyclohexane were added and mixed therewith. The inside of the reactor was purged with hydrogen gas, and then the solution was stirred while supplying hydrogen and performing a hydrogenation reaction for 6 hours at a temperature of 170° C. and a pressure of 4.5 MPa.

Once the hydrogenation reaction had ended, the reaction solution was filtered to remove the hydrogenation catalyst and was then filtered using a Zeta Plus® (Zeta Plus is a registered trademark in Japan, other countries, or both) filter 30H (produced by CUNO Inc.; pore diameter: 0.5 μm to 1 μm) and a metal fiber filter (produced by Nichidai Corporation; pore diameter: 0.4 μm), in order, so as to remove fine solid content. Thereafter, cyclohexane (solvent) and other volatile components were removed from the solution at a temperature of 260° C. and a pressure of 0.001 MPa or less using a cylindrical evaporator (Kontro produced by Hitachi, Ltd.), and hydrogenated block polymer was extruded in a molten state as strands from a die that was directly connected to the cylindrical evaporator. Cooling and subsequent cutting by a pelletizer were performed to obtain a hydrogenated block polymer.

The hydrogenated block polymer was dissolved in cyclohexane, and then 0.3 parts of 2,6-di-tert-butyl-p-cresol as an antioxidant was added to the resultant solution (containing 30.0 parts of polymer component) and was mixed therewith to produce a block polymer solution in which the concentration of the hydrogenated block polymer was 25%.

A $^1$H-NMR spectrum was measured both before and after the hydrogenation reaction. The percentage hydrogenation of the obtained hydrogenated block polymer as calculated based on the amount of decrease between before and after the hydrogenation reaction of an integrated value for signals corresponding to unsaturated bonds of main chain and side chain portions and unsaturated bonds of aromatic rings was 99.9%.

Cross-Linking

A block polymer latex obtained through phase-inversion emulsification in the same way as in Example 1 was diluted by adding 850 parts of distilled water per 100 parts of the block polymer latex. The diluted block polymer latex was loaded into a polymerization reactor that was equipped with a stirrer and had been purged with nitrogen, and was then heated to a temperature of 30° C. under stirring.

A separate vessel was used to produce a solution containing 0.01 parts of ferrous sulfate (produced by Chubu Chelest Co., Ltd.; product name: Frost Fe) as a reducing agent and 0.2 parts of divinylbenzene as a cross-linker. After adding the obtained solution into the polymerization reactor, 0.6 parts of 1,1,3,3-tetramethylbutyl hydroperoxide (produced by NOF Corporation; product name: PEROCTA H) was added as an oxidizing agent, and then a reaction was carried out at 30° C. for 1 hour.

This yielded a water dispersion of a particulate polymer formed by a polymer obtained through cross-linking of the block polymer.

Example 5

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that polyacrylic acid (produced by Sigma-Aldrich Corporation; weight-average molecular weight: 450,000) was prepared as the water-soluble polymer. Evaluations were conducted in the same manner as in Example 1. The results are shown in Table 1.

Example 6

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that the amount of 1,1,3,3-tetramethylbutyl hydroperoxide (product name: PEROCTA H; produced by NOF Corporation) was changed to 0.1 parts when performing cross-linking in production of the particulate polymer. Evaluations were conducted in the same manner as in Example 1. The results are shown in Table 1.

Example 7

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 4 with the exception that divinylbenzene was not used as a cross-linker in production of the particulate polymer. Evaluations were conducted in the same manner as in Example 1. The results are shown in Table 1.

Example 8

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that, in production of the binder composition for a non-aqueous secondary battery negative electrode, the water dispersion of the particulate polymer and the aqueous solution of the water-soluble polymer were loaded into the vessel such that the mass ratio in terms of solid content was particulate polymer:water-soluble polymer=75:25, and, in production of the slurry composition for a non-aqueous secondary battery negative electrode, the amount of the binder composition was changed to 2.91 parts in terms of solid content. Evaluations were conducted in the same manner as in Example 1. The results are shown in Table 1.

Comparative Example 1

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that a water dispersion of a particulate polymer was obtained as described below in production of the particulate polymer. Evaluations were conducted in the same manner as in Example 1. The results are shown in Table 1.

Production of Particulate Polymer

A reactor was charged with 150 parts of deionized water, 30 parts of sodium dodecylbenzenesulfonate aqueous solution (concentration: 10%) as an emulsifier, 25 parts of styrene as an aromatic vinyl monomer, and 2.5 parts of t-dodecyl mercaptan as a molecular weight modifier in this order. Next, gas inside the reactor was purged three times with nitrogen, and then 75 parts of 1,3-butadiene was added into the reactor as an aliphatic conjugated diene monomer.

The reactor was maintained at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction.

Thereafter, residual monomer was removed using a rotary evaporator having a water temperature of 60° C. to obtain a water dispersion of a particulate random polymer (particulate polymer).

Comparative Example 2

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that cross-linking was performed as described below in production of the particulate polymer. Evaluations were conducted in the same manner as in Example 1. The results are shown in Table 1.

Cross-Linking

The block polymer latex obtained by phase-inversion emulsification was diluted by adding 850 parts of distilled water per 100 parts of the block polymer latex. The diluted block polymer latex was loaded into a polymerization reactor that was equipped with a stirrer and had been purged with nitrogen, and was then heated to a temperature of 30° C. under stirring.

A separate vessel was used to produce a solution containing 0.01 parts of ferrous sulfate (produced by Chubu Chelest Co., Ltd.; product name: Frost Fe) as a reducing agent and 0.5 parts of divinylbenzene as a cross-linker. After adding the obtained solution into the polymerization reactor, 0.6 parts of 1,1,3,3-tetramethylbutyl hydroperoxide (produced by NOF Corporation; product name: PEROCTA H) was added as an oxidizing agent, and a reaction was carried out at 30° C. for 1 hour and then at 70° C. for 2 hours.

This yielded a water dispersion of a particulate polymer formed by a polymer obtained through cross-linking of the block polymer.

Comparative Example 3

A particulate polymer, a water-soluble polymer, a binder composition for a negative electrode, a slurry composition for a negative electrode, a negative electrode, a positive electrode, a separator, and a lithium ion secondary battery were prepared or produced in the same way as in Example 1 with the exception that in production of the particulate polymer, cross-linking of the block polymer was not performed, and the water dispersion (block polymer latex) containing the particulate block polymer was used in that form as the water dispersion of the particulate polymer. Evaluations were conducted in the same manner as in Example 1. The results are shown in Table 1.

TABLE 1

| | | | | | Example 1 | Example 2 | Example 3 | Example 4 | Example 5 | Example 6 |
|---|---|---|---|---|---|---|---|---|---|---|
| Slurry composition for negative electrode | Negative electrode active material (artificial graphite) [parts by mass] | | | | 100 | 100 | 100 | 100 | 100 | 100 |
| | Binder composition for negative electrode | Particulate polymer | Structure | | Block | Block | Block | Block | Block | Block |
| | | | Chemical composition | Styrene unit [mass %] | 25 | 25 | 25 | 25 | 25 | 25 |
| | | | | Isoprene unit [mass %] | — | — | — | — | — | — |
| | | | | Butadiene unit + Cross-linked butadiene unit [mass %] | — | — | — | — | — | — |
| | | | | Isoprene unit + Cross-linked isoprene unit [mass %] | 75 | 75 | 75 | — | 75 | 75 |
| | | | | Isoprene unit + Cross-linked isoprene unit + Hydrogenated isoprene unit [mass %] | — | — | — | 75 | — | — |
| | | | Coupling moiety | | Yes | Yes | Yes | Yes | Yes | Yes |
| | | | Divinylbenzene cross-linked structure | | No | No | No | Yes | No | No |
| | | | THF-insoluble content [mass %] | | 30 | 30 | 39 | 30 | 30 | 10 |
| | | | Amount [parts by mass] | | 1.98 | 2.00 | 1.98 | 1.98 | 1.98 | 1.98 |
| | | Water-soluble polymer | Type | | Poly methacrylic acid | — | Poly methacrylic acid | Poly methacrylic acid | Poly acrylic acid | Poly methacrylic acid |
| | | | Weight-average molecular weight [—] | | 100000 | — | 100000 | 100000 | 450000 | 100000 |
| | | | Amount [parts by mass] | | 0.02 | — | 0.02 | 0.02 | 0.02 | 0.02 |
| | | Mixing ratio (particulate polymer/ particulate polymer + water-soluble polymer) [mass %] | | | 99 | 100 | 99 | 99 | 99 | 99 |
| Evaluation | Process adhesiveness | | | | A | A | B | A | B | A |
| | Electrolyte solution injectability | | | | A | B | A | A | B | B |

| | | | | | Example 7 | Example 8 | Comparative Example 1 | Comparative Example 2 | Comparative Example 3 |
|---|---|---|---|---|---|---|---|---|---|
| Slurry composition for negative electrode | Negative electrode active material (artificial graphite) [parts by mass] | | | | 100 | 100 | 100 | 100 | 100 |
| | Binder composition for negative electrode | Particulate polymer | Structure | | Block | Block | Random | Block | Block |
| | | | Chemical composition | Styrene unit [mass %] | 25 | 25 | 25 | 25 | 25 |
| | | | | Isoprene unit [mass %] | — | — | — | — | 75 |
| | | | | Butadiene unit + Cross-linked butadiene unit [mass %] | — | — | 75 | — | — |
| | | | | Isoprene unit + Cross-linked isoprene unit [mass %] | — | 75 | — | 75 | — |
| | | | | Isoprene unit + Cross-linked isoprene unit + Hydrogenated isoprene unit [mass %] | 75 | — | — | — | — |
| | | | Coupling moiety | | Yes | Yes | No | Yes | Yes |
| | | | Divinylbenzene cross-linked structure | | No | No | No | Yes | No |

TABLE 1-continued

|  |  |  |  |  |  |  |
|---|---|---|---|---|---|---|
|  | THF-insoluble content [mass %] | 6 | 30 | 35 | 50 | 0 |
|  | Amount [parts by mass] | 1.98 | 2.18 | 1.98 | 1.98 | 1.98 |
|  | Type | Poly methacrylic acid | Poly methacrylic acid | Poly methacrylic acid | Poly methacrylic acid | Poly methacrylic acid |
|  | Weight-average molecular weight [—] | 100000 | 100000 | 100000 | 100000 | 100000 |
|  | Amount [parts by mass] | 0.02 | 0.73 | 0.02 | 0.02 | 0.02 |
|  | Mixing ratio (particulate polymer/ particulate polymer + water-soluble polymer) [mass %] | 99 | 75 | 99 | 99 | 99 |
| Evaluation | Process adhesiveness | A | B | C | C | A |
|  | Electrolyte solution injectability | B | B | C | B | C |

It can be seen from Table 1 that the negative electrodes of Examples 1 to 8 had excellent electrolyte solution injectability and process adhesiveness. It can also be seen from Table 1 that electrolyte solution injectability and process adhesiveness could not be sufficiently increased for the negative electrode of Comparative Example 1 in which a particulate polymer formed by a random polymer was used, process adhesiveness could not be sufficiently increased for the negative electrode of Comparative Example 2 in which a particulate polymer formed by a polymer having a high tetrahydrofuran-insoluble content was used, and electrolyte solution injectability could not be sufficiently increased for the negative electrode of Comparative Example 3 in which a particulate polymer formed by a polymer having zero tetrahydrofuran-insoluble content was used.

INDUSTRIAL APPLICABILITY

Through the presently disclosed binder composition for a non-aqueous secondary battery electrode and slurry composition for a non-aqueous secondary battery electrode, it is possible to form an electrode having excellent electrolyte solution injectability and process adhesiveness.

Moreover, according to the present disclosure, it is possible to obtain an electrode for a non-aqueous secondary battery that has excellent electrolyte solution injectability and process adhesiveness and a non-aqueous secondary battery that includes this electrode.

The invention claimed is:

1. A binder composition for a non-aqueous secondary battery electrode comprising a particulate polymer formed by a polymer, wherein
the polymer includes a block region composed of an aromatic vinyl monomer unit, and
the polymer has a tetrahydrofuran-insoluble content of not less than 5 mass % and not more than 40 mass %.

2. The binder composition for a non-aqueous secondary battery electrode according to claim 1, further comprising a water-soluble polymer, wherein
the water-soluble polymer includes a hydrophilic group, and
the water-soluble polymer has a weight-average molecular weight of not less than 15,000 and not more than 500,000.

3. The binder composition for a non-aqueous secondary battery electrode according to claim 2, wherein content of the particulate polymer is not less than 50 mass % and not more than 99.8 mass % of total content of the particulate polymer and the water-soluble polymer.

4. The binder composition for a non-aqueous secondary battery electrode according to claim 1, wherein the polymer further includes a coupling moiety.

5. The binder composition for a non-aqueous secondary battery electrode according to claim 1, wherein the polymer is obtained through cross-linking of a block polymer including an aliphatic conjugated diene monomer unit and a block region composed of an aromatic vinyl monomer unit.

6. A slurry composition for a non-aqueous secondary battery electrode comprising: an electrode active material; and the binder composition for a non-aqueous secondary battery electrode according to claim 1.

7. An electrode for a non-aqueous secondary battery comprising an electrode mixed material layer formed using the slurry composition for a non-aqueous secondary battery electrode according to claim 6.

8. A non-aqueous secondary battery comprising a positive electrode, a negative electrode, a separator, and an electrolyte solution, wherein
at least one of the positive electrode and the negative electrode is the electrode for a non-aqueous secondary battery according to claim 7.

* * * * *